3,761,460
TETRACOSAPEPTIDES
Janos Pless, Basel, Stephan Guttmann, Allschwil, and Roger Boissonnas, Bottmingen, Switzerland, assignors to Sandoz Ltd. (also known as Sandoz A.G.), Basel, Switzerland
No Drawing. Filed Dec. 27, 1966, Ser. No. 604,537
Claims priority, application Switzerland, Dec. 29, 1965, 18,028/65
Int. Cl. C07c 103/52
U.S. Cl. 260—112.5                     5 Claims

ABSTRACT OF THE DISCLOSURE

A new tetracosapeptide is provided of the formula D-seryl-L-tyrosyl - L - seryl - L - norleucyl-X-L-histidyl-L-phenylalanyl-L-arginyl - L - tryptophanyl-glycyl-L-lysyl-L - prolyl - L - valyl - glycyl - L - lysyl - L - lysyl - L-arginyl-L-arginyl - L - prolyl - L - valyl - L - lysyl - L-valyl-L-tyrosyl-Y, wherein X is L-glutamyl or L-glutaminyl and Y is L-proline or L-prolinamide, their therapeutically active acid addition salts and heavy metal complexes. The polypeptides disclosed, also named D-Ser$^1$-Nle$^4$-$\alpha$-$^{1-24}$-A.C.T.H., D-Ser$^1$-Nle$^4$-$\alpha^{1-24}$ - A.C.T.H. - amide, D-Ser$^1$-Nle$^4$-Gln$^5$-$\alpha^{1-24}$-A.C.T.H. and D - Ser$^1$ - Nle$^4$-Gln$^5$-$\alpha$-$^{1-24}$-A.C.T.H.-amide, are pharmaceutically useful due to their high corticotropic effects.

---

The present invention relates to new polypeptides and a process for the production thereof.

The present invention provides the tetracosapeptides of general formula, D-seryl-L-tyrosyl-L-seryl-L-norleucyl-X-L - histidyl - L - phenylalanyl - L - arginyl - L - tryptophanyl - glycyl - L - lysyl - L - prolyl - L- valyl-glycyl-L-lysyl - L - lysyl - L - arginyl-L-arginyl-L-prolyl-L-valyl-L-lysyl - L - valyl - L -tyrosyl - Y, in which X signifies an L-glutamyl or L-glutaminyl radical, and
Y signifies an L-proline or L-prolinamide radical, their therapeutically active acid addition salts and heavy metal complexes. These new tetracosapeptides of General Formula I, their salts and heavy metal complexes have a high adrenocorticotropic effect. The tetracosapeptides of General Formula I are hereinafter named as follows: D - Ser$^1$-Nle$_4$-tetracosapeptide, D-Ser.$^1$-Nle$^4$-tetracosapeptide-amide, D-Ser$^1$-Nle$^4$-Gln$^5$-tetracosapeptide and D-Ser$^1$-Nle$^4$-Gln$^5$-tetracosapeptide-amide.

The synthesis of a tetracosapeptide of formula L-seryl-L - tyrosyl - L - seryl - L - norleucyl - L - glutamyl-L-histidyl-L-phenylalanyl - L - arginyl - L - tryptophanyl-glycyl-L-lysyl-L-prolyl - L - valyl - glycyl - L - lysyl - L-lysyl - L - lysyl - L - arginyl-L-arginyl-L-prolyl-L-valyl-L-lysyl - L - valyl - L - tyrosyl - L - proline, having a corticotropic effect and hereinafter named Nle$^4$-tetracosapeptide, is known (Belgian Pat. No. 653,017).

An advantage of Nle$^4$-tetracosapeptide over natural ACTH is that the former has no antigenic effects. A further advantage is that Nle$^4$-tetracosapeptide, in contradistinction to natural ACTH, is devoid of a methionine radical in the 4-position, which methionine radical is easily oxidized whereby the hormone becomes inactive; Nle$^4$-tetracosapeptide contains a norleucine radical in place of the methionine radical present in ACTH, which norleucine radical has the same steric properties as the methionine radical, but is stable to oxidation. However, Nle$^4$-tetracosapeptide contains an L-serine radical in the 1-position, as does natural ACTH; this L-serine radical is easily affected by aminopeptidase degradation.

Attempts were therefore made to replace this terminal L-serine radical of Nle$^4$-tetracosapeptide by a radical which is stable to aminopeptidase degradation.

Replacement of the terminal L-serine radical of Nle$^4$-tetracosapeptide by a D-serine radical yielded D-Ser$^1$-Nle$^4$-tetracosapeptide which is not affected by aminopeptidases. Furthermore, it was surprisingly found that replacement of the glutamic acid radical in the 5-position of D-Ser$^1$-Nle$^4$-tetracosapeptide by glutamine radical and replacement of the proline radical in the 24-position of D-Ser$^1$-Nle$^4$-tetracosapeptide by a prolinamide radical yields the compounds D-Ser$^1$-Nle$^4$-tetracosapeptide-amide, D-Ser$^1$-Nle$^4$-Gln$^5$-tetracosapeptide and D-Ser$^1$-Nle$^4$-Gln$^5$-tetracosapeptide-amide, which are also not affected by aminopeptidases. As D-amino acid radicals are not found in the natural, biologically active peptide hormones, it was not to be expected that the replacement of a natural amino acid radical by an antipode not occurring in nature would result in compounds having biological and therapeutical properties not only qualitatively equal but also quantitatively superior to those of natural ACTH, as will be explained in detail hereinafter.

The tetracosapeptides of General Formula I may be produced by methods for the synthesis of compounds of this type in actual use or described in the literature on the subject, it being possible to join together the amino acids in the order indicated in the above formula one at a time or by first forming constituent peptide units and joining these together.

One method of producing the new tetracosapeptides of General Formula I consists in that L-valyl-$\epsilon$-N-R-L-lysyl - L - valyl - L-tyrosyl-L-proline-tert-butyl-ester (or amide), in which R signifies a carbo-tert-butyloxy or a carbo-tert-amyloxy radical, a carbobenzoxy, a toluenesulphonyl, a phthalyl, a formyl or a trifluoroacetyl radical, is condensed with N-carbobenzoxy-L-valyl-glycyl-$\epsilon$-N - R - L - lysyl-$\epsilon$-N-R-L-lysyl-nitro-L-arginyl-nitro-L-arginyl-L-proline, in which R has the above significance, the resulting N - carbobenzoxy - L-valyl-glycyl-$\epsilon$-N-R-L-lysyl - $\epsilon$ - N-R-L-lysyl-nitro-L-arginyl-nitro-L-arginyl-L-prolyl - L - valyl - $\epsilon$-N-R-L-lysyl-L-valyl-L-tyrosyl-L-proline-tert-butyl-ester (or amide), in which R has the above significance, is condensed with N - triphenylmethyl - L-glutaminyl (or $\gamma$-O-tert-butyl-L-glutamyl)-Im-triphenylmethyl - L - histidyl - L-phenylalanyl-L-arginyl-L-tryptophanyl-glycyl-$\epsilon$-N-R-L-lysyl-L-proline, in which R has the above significance, after removal of the carbobenzoxy radical and the nitro radicals, the resulting N-triphenylmethyl - L - glutaminyl (or $\gamma$-O-tert-butyl-L-glutaryl)-Im - triphenylmethyl-L-histidyl-L-phenylalanyl-L-arginyl-L - tryptophanyl - glycyl-$\epsilon$-N-R-L-lysyl-L-prolyl-L-valyl-glycyl - $\epsilon$ - N-R-L-lysyl-$\epsilon$-N-R-L-lysyl-L-arginyl-L-arginyl-L - prolyl - L - valyl-$\epsilon$-N-R-L-lysyl-L-valyl-L-tyrosyl-L-proline-tert-butyl-ester (or amide) in which R has the above significance, is condensed with N-R'-D-seryl-L-tyrosyl-L-seryl-L-norleucyl-azide, in which R' signifies a triphenylmethyl, a carbo-tert-butyloxy or a carbo-tert-amyloxy radical, a carbobenzoxy, a trifluoroacetyl, an acetyl, a chloroacetyl or a formyl radical, after removal of the N-triphenylmethyl radical, of the glutaminyl (or $\gamma$-O-tert-butyl-L-glutamyl)radical, and all the protective radicals of the resulting new, protected tetracosapeptide N - R' - D - seryl-L-tyrosyl-L-seryl-L-norleucyl-L-glutaminyl (or $\gamma$ - O - tert-butyl-L-glutamyl)-Im-triphenylmethyl - L -histidyl - L - phenylalanyl-L-arginyl-L-tryptophanyl - glycyl - $\epsilon$ - N-R-L-lysyl-L-prolyl-L-valyl-glycyl-$\epsilon$ - N - R - L-lysyl-$\epsilon$-N-R-L-lysyl-L-arginyl-L-arginyl-L-prolyl - L-valyl-$\epsilon$-N-R-L-lysyl-L-valyl-L-tyrosyl-L-proline-tert-butyl-ester (or amide), in which R and R' have the above significance, are removed in one or more stages in an acid medium.

The starting materials for producing the tetracosapeptides of General Formula I, insofar as they were hitherto unknown, may be obtained by methods for the synthesis of peptides in actual use or described in the literature, it being possible to join together the amino acids one at a time or by first forming constituent peptide units and joining these together.

It should be noted that the tetracosapeptides of General Formula I may likewise be obtained or used in the form of their salts. Examples of acids for acid addition salt formation are: acetic, propionic, glycolic, lactic, pyruvic, malonic, succinic, maleic, fumaric, tartaric, citric, benzoic, cinnamic, salicylic, 2-phenoxy- or 2-acetoxy-benzoic, mandelic, methanesulphonic, ethane-sulphonic, hydroxy-ethanesulphonic, benzene- or toluenesulphonic, naphthalenesulphonic and sulphanilic acid, polymeric acids, e.g. tannic, alginic or polygalacturonic acid, polyphloretinic phosphate or carboxymethyl cellulose, and halogen hydracids, e.g. hydrochloricv or hydrobromic acid, nitric, thiocyanic, sulphuric and phosphoric acid. Zinc may, for example, be used for the heavy metal complex.

A major advantage of the synthetic tetrocosapeptides of General Formula I over the natural hormone extracted from animal material is that the former have no antigenic effects. Absence of antigenic effect in a substance indicates no objection to its use even in the face of an earlier allergic reaction to natural ACTH.

According to the usual and accepted standard tests the tetracosapeptides of the invention have the following biological activity:

625 ($\pm$150) corticotropin IU for every mg. of D-Ser$^1$-Nle$^4$-tetracosapeptide
635 ($\pm$150) corticotropin IU for every mg. of D-Ser$^1$-Nle$^4$-tetracosapeptideamide
650 ($\pm$150) corticotropin IU for every mg. of D-Ser$^1$-Nle-Gln$^5$-tetracosapeptide
665 ($\pm$150) corticotropin IU for every mg. of D-Ser$^1$-Nle$^4$-Gln$^5$-tetrasosapeptideamide .

The tetracosapeptides of the invention were tested in accordance with the third International Standard for coticotropin which is available in the form of an "International Standard for Corticotropin" and permits the standardization of ACTH preparations in International Units.

It has been found that upon intravenous administration the tetracosapeptides of the invention have a longer duration of action than the hitherto known naturally occurring and synthetic ACTH compounds. The dose of the tetracosapeptides of the invention ranges from about 40 to 60 IU daily, in exceptional cases between 10 and 100 IU daily.

The unexpectedly high activity of the new tetracosapeptides, which was ascertained upon standardization, has been confirmed upon therapeutic application, so that on a weight basis the new tetracosapeptides are more active than all the hitherto known naturally occurring and synthetic ACTH compounds.

The tetracosapeptides of General Formula I may be used as medicaments, for example in the form of pharmaceutical preparations. These may contain the said compounds in mixture with an organic or inorganic carrier material which is suitable for parenteral administration. Appropriate carrier materials are substances which do not react with the new compounds, e.g. gelatin, lactose, starch, magnesium stearate, talcum, vegetable oils, benzyl alcohols, gum arabic, polyalkylene glycols, vaseline, cholesterol and other known pharmaceutical carrier materials. The pharmaceutical preparations may, for example, be used in the liquid form as solutions, suspensions or emulsions. They may be sterilized and/or they may contain adjuvants, such as preserving, stabilizing, wetting or emulsifying agents. However, they may contain other therapeutically valuable substances. The new compound may also be administered in the form of a depot preparation as is the case with natural ACTH.

Examples of radicals for blocking the amino radical of the serine radical during the synthesis of the new tetracosapeptides are the triphenylmethyl, the carbo-tert-butyloxy and the carbo-tert-amyloxy radical, but other suitable protective radicals, e.g. the carbobenzoxy, the trifluoroacetyl, the acetyl, the chloroacetyl and the formyl radical, may likewise be used.

Suitable radicals for blocking the $\epsilon$-amino radical of the lysine radical are the carbo-tert-butyloxy and the carbo-tert-amyloxy radical, but other suitable protective radicals, e.g. the carbobenzoxy, toluene-sulphonyl, phthalyl, formyl and trifluoroacetyl radical, may likewise be used.

A suitable radical for blocking the $\gamma$-carboxyl radical of the glutaminic acid radical is the tert-butyloxy radical, but other suitable protective radicals, e.g. the methoxy, the ethoxy, the tert-amyloxy, the amide or the benzyloxy radical, may likewise be used.

A suitable radical for the blocking of the imidazole radical of the histidine radical is the triphenylmethyl radical, but other suitable protective radicals, e.g. the carbo-tert-butyloxy, carbo-tert-amyloxy, carbobenzoxy or benzyl radical, may likewise be used.

A suitable radical for the blocking of the guanido radical of the arginine radical is the nitro radical, but other suitable protective radicals, e.g. the tosyl, p-nitrocarbobenzoxy or the 2 - (isopropyloxycarbonyl) - 3,4,5,6-tetrachlorobenzoyl radical, may likewise be used. It is also possible to use the protective effect of the protonization of the guanido radical during the synthesis.

The following abbreviations are used in the text and in the drawings:

CBO=carbobenzoxy
Trit=trityl=triphenylmethyl
CTB=carbo-tert-butyloxy
No$_2$=nitro
OCP=2,4,5-trichlorophenoxy
OTB=tert-butyloxy
OMe=methoxy
OEt=ethoxy
Arg=L-arginyl
Glu=L-glutamyl
Gln=L-glutaminyl
Gly=glycyl
His=L-histidyl
Lys=L-lysyl
Nle=L-norleucyl
Phe=D-phenylalanyl
Pro=L-prolyl
Ser=L-seryl
D-Ser=D-seryl
Try=L-tryptophanyl
Tyr=L-tyrosyl
Val=L-valyl
Im=imidazolyl In the following non-limitative examples all temperatures are indicated in degrees centigrade.

CHART A

Production of H-Val-Gly-(R)Lys-(R)Lys-Arg-Arg-Pro-Val-(R)Lys-Val-Tyr-Pro-R$_1$

R$_1$=NH$_2$ or —OTB

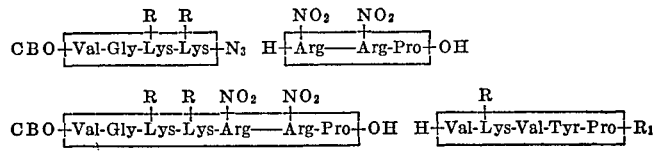

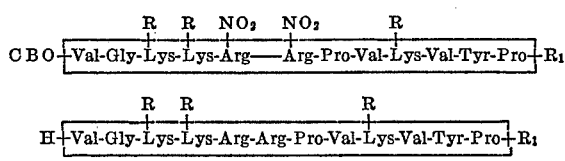

CHART B

Production of H-D-Ser-Tyr-Ser-Nle-Glu(R₂) His-Phe-Arg-Try-Gly-Lys
Pro-Val-Gly-Lys-Lys-Arg-Arg-Pro-Val-Lys-Val-Tyr-Pro-R₂

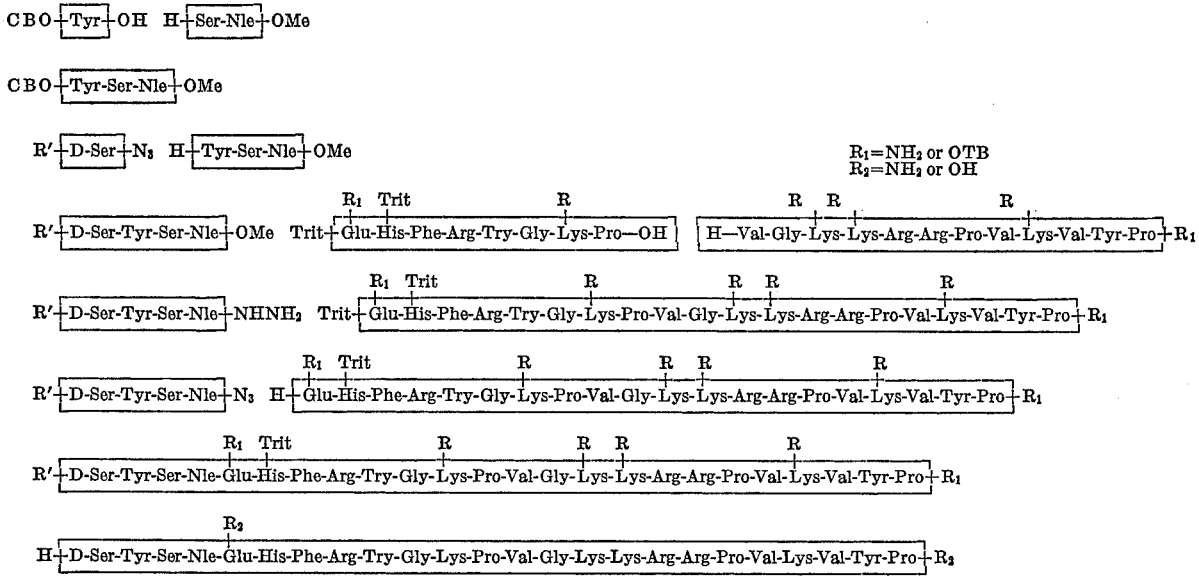

EXAMPLE 1

L-valyl-glycyl-carbo-tert-butyloxy-L-lysyl-carbo-tert-butyloxy - L-lysyl-L-arginyl-L-arginyl-L-prolyl-L-valyl-carbotert - butyloxy-L-lysyl-L-valyl-L-tyrosyl-L-prolinamide. (H - Val - Gly-(CTB)Lys-(CTB)Lys-Arg-Arg-Pro-Val-(CTB)Lys-Val-Tyr-Pro-NH₂)

88 g. of CBO-(NO₂)Arg-(NO₂)Arg-Pro-OMe are dissolved in a 90% mixture of dioxane and water and 220 cc. of 2 N sodium hydroxide solution are added. After 2 hours, dilution is effected with one litre of water and washing out is effected several times with ethyl acetate. The aqueous solution is subsequently acidified with 4 N hydrochloric acid, the precipitated product is dissolved in a mixture of methanol/acetone (1:1) and precipitation is effected by the addition of ethyl ether. 70 g. of CBO-(NO₂)Arg-(NO₂ Arg-Pro-OH, having a melting point of 108° (with decomposition), [α]_D=—19° in dimethyl formamide, are obtained. The tripeptide obtained above is dissolved in 400 ml. of a 33% solution of hydrogen bromide in glacial acetic acid, the solution is allowed to stand at 20° for one hour, is concentrated to 200 ml. and precipitated with ethyl ether; filtration, washing with ethyl acetate and drying are effected. 72 g. of H-(NO₂)Arg-(NO₂)Arg-Pro-OH. 3 HBr, having a melting point of 84° (with decomposition), [α]_D²¹=—19° in 95% acetic acid, are obtained. 84 g. of CBO-Val-Gly-(CTB)Lys-N₃ (produced from 85 g. of the corresponding hydrazide) are added at 0° to a solution of 72 g. of H-(NO₂)Arg-(NO₂)Arg-Pro-OH hydrobromide in 600 ml. of dimethyl formamide and 56 ml. of tirethylamine. The solution is allowed to stand for 16 hours and the solvent is evaporated. The residue is dissolved in a mixture of n-butanol and ethyl acetate (2:8) and washed several times with dilute sulphuric acid. The volume of the solution is reduced in a vacuum and precipitation is effected with ether. 90 g. of CBO - Val-Gly-(CTB)Lys-(CTB)Lys-(NO₂)Arg-(NO₂) Arg-Pro-OH, having a melting point of 151° (with decomposition), [α]_D=—38° in methanol, are obtained.

56 g. of CBO-Val-Gly-(CTB)Lys-(CTB)Lys-(NO)₂ Arg(NO₂)Arg-Pro-OH are dissolved in 900 ml. of dimethyl formamide and 900 ml. of tetrahydrofuran. After the addition of 6.2 ml. of triethylamine the solution is cooled to —10° and 4.2 ml. of chloroformic acid ethyl ester are added at this temperature. After 10 minutes 30 g. of H-Val-(CTB)Lys-Val-Tyr-Pro-NH₂ in 160 ml. of dimethyl formamide are added and stirring is effected at 20° for a further 16 hours. The solvent is evaporated in a vacuum and the residue washed out with water. The peptide is dissolved in hot ethanol and precipitation is effected with ethyl acetate. After filtering with suction and drying, 70 g. of CBO-Val-Gly-(CTB)Lys-(CTB) Lys - (NO₂)Arg(NO₂)Arg-Pro-Val-(CTB)Lys-Val-Tyr-Pro-NH₂, having a melting point of 196° (with decomposition), [α]_D=—38° in dimethyl formamide, are obtained.

70 g. of CBO-Val-Gly-(CTB)Lys-(CTB)Lys-(NO₂) Arg-(NO₂)Arg-Pro-Val-(CTB)Lys-Val-Tyr-Pro-NH₂ are dissolved in 1.5 litres of 80% acetic acid, a palladium catalyst is added, hydrogenation is effected until hydrogen is no longer taken up and the catalyst is filtered off. After reducing the volume of the solution, the residue is dissolved in 500 ml. of methanol, cooling is effected to —5°, 4.1 g. of p-toluenesulphonic acid are added and precipitation is subsequently effected with ether. 65 g. of H - Val-Gly-(CTB)Lys-(CTB)Lys-Arg-Arg-Pro-Val-(CTB)Lys-Val-Tyr-Pro-NH₂ are obtained as trityl-toluene sulphonate, having a melting point of 180° (with decomposition). [α]_D²⁰= —48° in dimethyl formamide.

EXAMPLE 2

L-valyl-glycyl-carbo-tert - butoxy - L - lysyl - carbo - tert-butyloxy - L-lysyl-L-arginyl-L-arginyl-L-propyl-L-valyl-carbo - tert - butyloxy-L-lysyl-L-valyl-L-tyrosyl-L-proline - tert - butyl-ester.(H-Val-Gly-(CTB)Lys-(CTB)Lys-Arg-Arg-Pro-Val-(CTB)-Lys-Val-Tyr-Pro-OTB)

56 g. of CBO-Val-Gly-(CTB)Lys-(CTB)Lys-(NO₂)Arg-(NO₂)Arg-Pro-OH are dissolved in 900 ml. of dimethyl formamide and 900 ml. of tetrahydrofuran. After the addition of 6.2 ml. of triethylamine the solution is cooled to —10° and 4.2 ml. of chloroformic acid ethyl ester are added at this temperature. After 10 minutes 34 g. of H-Val-(CTB)Lys-Val-Tyr-Pro-OTB in 160 ml. of dimethyl formamide are added and stirring is effected at 20° for a further 16 hours. The solvent is evaporated in a vacuum and the residue washed out with water. The peptide is dissolved in hot ethanol and precipitated with ethyl acetate. After filtering with suction and drying, 70 g. of CBO - Val - Gly-(CTB)Lys-(CTB)Lys-(NO₂)Arg-(NO₂)Arg-Pro-Val-(CTB)Lys-Val-Tyr-Pro-OTB, having a melting point of 190° (with decomposition), [α]_D²⁰= —38° in dimethyl formamide, are obtained.

70 g. of CBO-Val-Gly-(CTB)Lys-(CTB)Lys-(NO₂)Arg-(NO₂)Arg-Pro-Val-(CTB)-Lys-Val-Tyr-Pro-OTB are dissolved in 1.5 litres of 80% acetic acid, a palladium catalyst is added, hydrogenation is effected until hydrogen is no longer taken up and the catalyst is filtered off. After reducing the volume of the solution, the residue is dissolved in 500 ml. of methanol, cooling is effected to —5°, 4.1 g. of p-toluenesulphonic acid are added and precipitation is effected with ether. 65 g. of H-Val-Gly-(CTB)Lys - (CTB)Lys - Arg-Arg-Pro-Val-(CTB)Lys-Val-Tyr-Pro-OTB are obtained as trityl-toluene sulphonate, having a melting point of 182° (with decomposition), [α]_D²⁰= —44° in dimethyl formamide.

EXAMPLE 3

γ - O - tert-butyl-L-glutamyl-Im-trityl-L-histidyl-L-phenylalanyl - L - arginyl-L-tryptophanyl-glycyl-N-carbo-tert-butyloxy - L - lysyl - L - prolyl-L-valyl-glycyl-N-carbo-tert - butyloxy - L - lysyl-N-carbo-tert-butyloxy-L-lysyl-L - arginyl - L - arginyl-L-prolyl-L-valyl-N-carbo-tert-butyloxy - L - lysyl-L-valyl-L-tyrosyl-L-prolinamide. (H - (OTB)Glu - (Trit)His-Phe-Arg-Try-Gly-(CTB) Lys - Pro - Val - Gly-(CTB)Lys-(CTB)Lys-Arg-Arg-Pro-Val-(CTB)-Lys-Val-Tyr-Pro-NH₂)

60 g. of H-Val-Gly-(CTB)Lys-(CTB)Lys-Arg-Arg-Pro-Val-(CTB)Lys-Val-Tyr-Pro-NH₂.3 Tos-OH are dissolved in 300 ml. of pyridine and 300 ml. of acetonitrile. 57 g. of Trit-(OTB)Glu-(Trit)His-Phe-Arg-Try-Gly-(CTB)Lys-Pro-OH are subsequently added and when all the material is dissolved, cooling is effected to 0° and 28.6 g. of dicyclohexyl carbodiimide are added. After shaking at 20° to 24 hours, the urea is filtered off and the solution precipitated with ether. The product is dissolved several times in methanol and precipitated with ethyl acetate. 92 g. of Trit-(OTB)Glu-(Trit)His-Phe-Arg-Try - Gly-(CTB)Lys-Pro-Val-Gly-(CTB)Lys-(CTB)Lys-Arg-Arg-Pro-Val-(CTB)Lys-Val-Tyr - Pro - NH₂ trityl-toluene sulphonate, having a melting point of 189° with decomposition, [α]_D²⁰= —57° in methanol, are obtained.

44 g. of Trit-(OTB)Glu-(Trit)His-Phe-Arg-Try-Gly-(CTB)Lys - Pro-Val-Gly-(CTB)Lys-(CTB)Lys-Arg-Arg-Pro-Val-(CTB)Lys-Val-Tyr-Pro-NH₂.3Tos-OH are dissolved in 500 ml. of 80% acetic acid and the solution is allowed to stand at 30° for 2 hours. 50 ml. of Amberlite IRA–410 in the acetate form are added, filtration and evaporation in a vacuum are effected and the residue is dissolved in methanol. After precipitating with ether, 40 g. of H-(OTB)Glu-(Trit)His-Phe-Arg-Try-Gly-(CTB)-Lys - Pro - Val-Gly-(CTB)Lys-(CTB)Lys-Arg-Arg-Pro-Val-(CTB)Lys-Val-Tyr-Pro-NH₂, having a decomposition point of 160°, [α]_D²⁰= —51° in methanol, are obtained.

EXAMPLE 4

γ - O-tert-butyl-L-glutamyl-Im-trityl-L-histidyl-L-phenylalanyl - L - arginyl-L-tryptophanyl-glycyl-N-carbo-tert-butyloxy - L - lysyl - L - prolyl-L-valyl-glycyl-N-carbo-tert - butyloxy - L - lysyl-N-carbo-tert-butyloxy-L-lysyl-L - arginyl - L - arginyl-L-prolyl-L-valyl-N-carbo-tert-butyloxy - L - lysyl - L - valyl-L-tyrosyl-L-proline-tert-butyl - ester.(H - (OTB)Glu-(Trit)His-Phe-Arg-Try-Gly - (CTB)Lys - Pro - Val-Gly-(CTB)Lys-(CTB)Lys-Arg-Arg-Pro-Val-(CTB)Lys-Val-Tyr-Pro-(OTB))

61 g. of H-Val-Gly-(CHB)Lys-(CTB)Lys-Arg-Arg-Pro-Val-(CTB)Lys-Val-Tyr-Pro-OTB.3 Tos-OH are dissolved in 300 ml. of pyridine and 300 ml. of acetonitrile. 57 g. of Trit - (OTB)Glu - (Trit)His - Phe - Arg - Try - Gly-(CTB)Lys-Pro-OH are subsequently added and when all the material is dissolved, cooling is effected to 0° and 28.6 g. of dicyclohexyl carbodiimide are added. After shaking at 20° for 24 hours, the urea is filtered off and the solution precipitated with ether. The product is dissolved several times in methanol and precipitated with ethyl acetate. 88 g. of Trit-(OTB)Glu-(Trit)His-Phe-Arg-Try-Gly-(CTB)Lys - Pro - Val - Gly - (CTB)Lys - (CTB) - Lys-Arg-Arg-Pro-Val-(CTB)Lys-Val-Tyr-Pro-OTB trityl-toluene sulphonate, having a melting point of 189° with decomposition, [α]_D²⁰=—53° in methanol, are obtained.

45 g. of Trit-(OTB)Glu-(Trit)His-Phe-Arg-Try-Gly-(CTB)Lys - Pro - Val - Gly - (CTB)Lys - (CTB)Lys-Arg - Arg - Pro - Val - (CTB)Lys - Val - Tyr - Pro-OTB.3 Tos-OH are dissolved in 500 ml. of 80% acetic acid and the solution is allowed to stand at 30° for 2 hours. 50 ml. of Amberlite IRA–410 in the acetate form are added, filtration and evaporation in a vacuum are effected and the residue is dissolved in methanol. After precipitating with ether, 40 g. of H-(OTB)Glu-(Trit)His-Phe - Arg - Try - Gly - (CTB)Lys - Pro - Val - Gly-(CTB)Lys - (CTB)Lys - Arg - Arg - Pro - Val - (CTB)Lys-ValTyr-ProOTB, having a decomposition point of 183°, [α]_D²⁰=—47° in methanol, are obtained.

EXAMPLE 5

N - trityl - L - glutaminyl - Im - trityl-L - histidyl - L-phenylalanyl - L - arginyl - L - tryptophanyl - glycycl-N-carbo-tert-butyloxy-L-lysyl - L - proline. (Trit - Gln-(Trit)His-Phe-Arg-Try-Gly-(CTB)Lys-Pro-OH)

45 g. of H-His-Phe-OMe.2HBr and 26 ml. of triethylamine are dissolved in 100 ml. of dimethyl formamide, stirring is effected at 0° for 10 minutes, filtration is effected, 45 g. of CBO-Glen-OCP are added to the filtrate and the mixture is allowed to stand at 20° for 16 hours. The dimethyl formamide is evaporated, the residue dissolved in ethyl acetate, washing is effected with dilute ethyl acetate/water and 1 N sodium bicarbonate solution, drying over sodium sulphate and evaporated are effected. The residue is crystallized from ethyl acetate, whereby 38 g. of CBO-Gln-His-Phe-OMe, having a melting point of 187°, are obtained. The tripeptide obtained above is dissolved in 300 ml. of methanol and 33 ml. of 2 N hydrochloric acid, hydrogenation is effected in the presence of 5 g. of 10% palladium/charcoal, filtration and evaporation are effected. The residue is dissolved in 150 ml. of methylene chloride, cooling is effected to 0°, 21 ml. of triethylamine and subsequently 27 g. of triphenylchloromethane are added, the mixture is allowed to stand at 20° for 16 hours, is washed with dilute acetic acid, water and a 1 N sodium bicarbonate solution, dried and evaporated. The residue is dissolved in diethyl ether and precipitated with petroleum ether. 49 g. of Trit-Gln-(Trit)His-Phe-OMe are obtained and are dissolved in 100 ml. of methanol. 5 ml. of hydrazine are added, the mixture is allowed to stand at 20° for 24 hours, is concentrated to a volume of 50 ml., 500 ml. of diethyl ether are added and washing is effected with a 0.1 N common salt solution. Drying, concentration to 50 ml. and precipitation with petroleum ether are effected. 40 g. of Trit-Gln-(Trit)His-Phe-NHNH$_2$, having a melting point of 85° with decomposition, $[\alpha]_D^{20}=-15°$ in dimethyl formamide, are obtained.

40 g. of Trit-Gln-(Trit)His-Phe-NHNH$_2$ are dissolved in 100 ml. of dimethyl formamide and 100 ml. of isopropanol, cooling is effected to —10° and 40 ml. of 4 N hydrochloric acid are added and subsequently 9 ml. of 5 N sodium nitrite solution are added whilst stirring. After 5 minutes, 28 ml. of triethylamine and 100 ml. of ice water are added, filtering with suction is effected, the precipitate is dissolved in ethyl acetate, washing is effected with a saturated common salt solution, drying and evaporation at 0° are effected. The residue is dissolved in 100 ml. of dimethyl formamide, 26 g. of H-Arg-Try-Gly-(CTB)Lys-Pro-OH, 3 AcOH and 4.5 ml. of triethylamine are added, the mixture is allowed to stand at 0° for 16 hours, 1000 ml. of ethyl acetate are added, washing with 0.5 N acetic acid, water and 0.5 N pyridine and evaporation are effected. The residue is dissolved in 100 ml. of ethyl acetate and precipitation is effected with diethyl ether. 55 g. of Trit - Gln - (Trit)His - Phe - Arg - Try - Gly - (CTB)Lys-Pro-OH, having a melting point of 185°, $[\alpha]_D^{20}=-15°$ in dimethyl formamide, are obtained.

EXAMPLE 6

L - glutaminyl - Im - trityl - L - histidyl - L - phenylalanyl - L - arginyl - L - tryptophanyl - glycyl - L - carbo - tert - butyloxy - L - lysyl - L - prolyl - L - valyl - glycyl - N - carbo - tert - butyloxy - L - lysyl - N - carbo - tert-butyloxy - L - lysyl - L - arginyl - L - arginyl - L - prolyl - L - valyl - N - carbo - tert - butyloxy - L - lysyl-L-valyl-L-tyrosyl-L-prolinamide. (H - Gln - (Trit)His-Phe - Arg - Try Gly - (CTB)Lys - Pro - Val- Gly- (CTB)Lys - (CTB)Lys - Arg - Arg - Pro - Val- (CTB)Lys-Val-Tyr-Pro-NH$_2$)

61 g. of H-Val-Gly-(CTB)Lys-(CTB)Lys-Arg-Arg-Pro-Val-(CTB)Lys-Val-Tyr-Pro-NH$_2$.3 Tos-OH are dissolved in 300 ml. of pyridine and 300 ml. of acetonitrile. 55 g. of Tri-Gln-(Trit)His-Phe-ArgTry-Gly-(CTB)Lys-Pro-OH are subsequently added and when all the material is dissolved, cooling is effected to 0° and 28.6 g. of dicyclohexyl carbodiimide are added. After shaking at 20° for 24 hours, the urea is filtered off and the solution precipitated with ether. The product is dissolved several times in methanol and precipitated with ethyl acetate. 86 g. of Trit - Gln - (Trit)His - Phe - Arg - Try - Gly - (CTB)Lys-Pro - Val - Gly - (CTB)Lys - (CTB)Lys - Arg - Arg - Pro-Val - (CTB)Lys - Val -Tyr - Pro- NH$_2$ trityl-toluene sulphonate, having a melting point of 181° with decomposition, $[\alpha]_D^{20}=-53°$ in methanol, are obtained.

43 g. of Trit - Gln - (Trit)His - Phe - Arg - Try - Gly-(CTB)Lys - Pro - Val - Gly - (CTB)Lys - (CTB)Lys-Arg - Arg - Pro - Val - (CTB)Lys - Val - Tyr - Pro-NH$_2$.3 Tos-OH are dissolved in 500 ml. of 80% acetic acid and the solution is allowed to stand at 30° for 2 hours. 50 ml. of Amberlite IRA–410 in the acetate form are added, filtration and evaporation in vacuum are effected and the residue is dissolved in methanol. After precipitating with ether, 38 g. of H-Gln-(Trit)His-Phe-Arg-Try - Gly -(CTB)Lys - Pro - Gly - (CTB)Lys-(CTB)Lys-Arg-Arg-Pro-Val-(CTB)Lys-Val-Tyr-Pro-NH$_2$, having a decomposition point of 175°, $[\alpha]_D^{20}=-45°$ in methanol, are obtained.

EXAMPLE 7

L - glutaminyl - Im - trityl - L - histidyl - L - phenylalanyl - L - arginyl - L - tryptophanyl - glycyl - N - carbo - tert - butyloxy - L - lysyl - L - prolyl - L - valyl-glycyl - N - carbo - tert - butyloxy - L - lysyl - N-carbo-tert - butyloxy - L - lysyl - L - arginyl - L - arginyl - L-prolyl - L - valyl - N - carbo - tert - butyloxy - L-lysyl - L - valyl - L - tyrosyl - L - proline - tert - butyl-ester. (H - Gln - (Trit)His - Phe - Arg - Try - Gly-(CTB)Lys - Pro - Val - Gly - (CTB)Lys - (CTB)Lys-Arg - Arg - Pro - Val - (CTB)Lys - Val - Tyr - Pro-OTB)

60 g. of H - Val - Gly - (CTB)Lys - (CTB)Lys-Arg-Arg - Pro - Val - (CTB)Lys - Val - Tyr - Pro - OTB. 3 Tos OH are dissolved in 300 ml. of pyridine and 300 ml. of acetonitrile. 55 g. of Trit - Gln - (Trit)His-Phe-Arg-Try-Gly-(CTB)Lys-Pro-OH are subsequently added and when all the material is dissolved, cooling is effected to 0° and 28.6 g. of dicyclohexyl carbodiimide are added. After shaking at 20° for 24 hours, the urea is filtered off and the solution precipitated with ether. The product is dissolved several times in methanol and the solution precipitated with ethyl acetate. 87 g. of Trit-Gln-(Trit) His - Phe - Arg - Try - Gly - (CTB)Lys - Pro - Val - Gly-(CTB)Lys - (CTB)Lys - Arg - Arg - Pro -Val - (CTB) Lys - Val - Tyr - Pro - OTB trityl-toluene sulphonate, having a melting point of 180° with decomposition, $[\alpha]_D^{20}=-50°$ in methanol, are obtained.

43 g. of Trit-Gln-(Trit)His-Phe-Arg-Try-Gly-(CTB) Lys - Pro - Val - Gly - (CTB)Lys - (CTB)Lys - Arg - Arg-Pro - Val - (CTB)Lys - Val - Tyr - Pro - OTB. 3Tos-OH are dissolved in 500 ml. of 80% acetic acid and the solution is allowed to stand at 30° for 2 hours. 50 ml. of Amberlite IRA–410 in the acetate form are added, filtration and evaporation in a vacuum are affected and the residue is dissolved in methanol. After precipitating with ether, 39 g. of H - Gln - (Trit)His - Phe - Arg - Try - Gly-(CTB)Lys - Pro - Val - Gly - (CTB)Lys - (CTB)Lys-Arg - Arg - Pro - Val - (CTB)Lys-Val-Tyr-Pro-OTB, having a decomposition point of 170°, $[\alpha]_D^{20}=-44°$ in methanol, are obtained.

EXAMPLE 8

Carbo - tert - butyloxy - D - seryl - L - tyrosyl - L - seryl-L - norleucine hydrazide. (CTB - D - Ser - Tyr - Ser-Nle-NHNH$_2$)

60 g. of D-serine methyl ester hydrochloride are dissolved in 200 ml. of dimethyl formamide and 54 ml. of triethylamine, cooling is effected to 0° and the triethylamine hydrochloride is filtered off. Dimethyl formamide is evaporated in a high vacuum and the residue dissolved in 150 ml. of pyridine. 100 g. of tert-butyl-oxy-carbonyl azide are added dropwise and the mixture is allowed to stand at 20° for 2 days. The solvent is evaporated and the product is taken up in ethyl acetate. After washing with water, dilute hydrochloric acid and potassium bicarbonate solution, drying is effected over sodium sulphate. After evaporating the ethyl acetate, CTB-D-Ser-OMe results as an oil. The ester is dissolved in 500 ml. of methanol and is allowed to stand at 20° for 2 days with 50 ml. of hydrazine hydrate. After evaporating the methanol, the hydrazide crystallizes. After recrystallization from hot ethyl acetate, 53 g. of CTB-D-Ser-NHNH$_2$, having a melting point of 114°, $[\alpha]_D^{21}=-3°$ in dimethyl formamide, are obtained.

54 g. of H-Ser-Nle-OMe.HCl and 63 g. of CBO-Tyr-OH are dissolved in 860 ml. of acetonitrile, cooling is effected to 0°, 28 ml. of triethylamine are added, cooling is effected to —10° and 41 g. of dicyclohexyl carbodiimide are added. The mixture is stirred at 0° for 16 hours and filtration is then effected. The precipitate is washed with 1400 ml. of pyridine. The combined filtrates are evaporated and the residue crystallized from ethyl acetate. 101 g. of CBO-Tyr-Ser-Nle-OMe (melting point 140–142°, $[\alpha]_D^{20}=-15°$ in dimethyl formamide) are obtained.

51 g. of the product obtained above are dissolved in 2 litres of a 0.1 N solution of hydrochloric acid in methanol and hydrogenation is effected in the presence of 10 g. of palladium/charcoal. After about two hours hydrogen is no longer taken up. Filtration and evaporation are effected and the residue is crystallized from a mixture of methanol/ether (3:1). 42 g. of H-Tyr-Ser-Nle-OMe.HCl, having a melting point of 227°, $[\alpha]_D^{20}=-7°$ in dimethyl formamide, are obtained.

10 g. of CTB-D-serine hydrazide are dissolved at −10° in 136 ml. of 1 N hydrochloric acid containing 15 g. of sodium chloride. 160 ml. of ethyl acetate and subsequently 3.8 g. of sodium nitrite are added in 3 portions at the same temperature. The mixture is allowed to react for a further 5 minutes at −10° whilst stirring continuously. The ethyl acetate phase is separated, washed with a cold 10% potassium bicarbonate solution and dried with sodium sulphate. A solution of 13 g. of H-Tyr-Ser-Nle-OMe hydrochloride in 60 ml. of dimethyl formamide and 6 ml. of triethylamine is added to the dried solution. The ethyl acetate is subsequently evaporated in a vacuum and the solution allowed to stand at 20° for 16 hours. The remaining solvent is evaporated in a vacuum and the residue dissolved in ethyl acetate. Washing with dilute phosphoric acid and potassium bicarbonate solution and drying over sodium sulphate are effected. After evaporating the solvent and precipitating with ether, 15 g. of CTB-D-Ser-Tyr-Ser-Nle-OMe, having a melting point of 135°, $[\alpha]_D^{20}=-6°$ in methanol, are obtained.

11 g of CTB-D-Ser-Tyr-Ser-Nle-OMe are dissolved in 100 ml. of methanol and 4.5 ml. of hydrazine hydrate are added. The mixture is allowed to stand over night at 20°, whereupon the product crystallizes. Filtration and washing with methanol and petroleum ether are effected. 7.7 g. of CTB-D-Ser-Tyr-Ser-Nle hydrazide, having a melting point of 210°, $[\alpha]_D^{20}=$ 6.5° in dimethyl formamide, are obtained.

EXAMPLE 9

D - seryl - L - tyrosyl - L - seryl - L - norleucyl - L-glutamyl - L - histidyl - L - phenylalanyl - L - arginyl-L - tryptophanyl - glycyl - L - lysyl - L - prolyl - L-valyl - glycyl - L - lysyl - L - lysyl - L - arginyl - L-arginyl - L - prolyl - L - valyl - L - lysyl - L - valyl - L-tyrosyl - L - prolinamide. (D - Ser - Tyr - Ser - Nle-Glu - His - Phe - Arg - Try - Gly - Lys - Pro - Val-Gly - Lys - Lys - Arg - Arg - Pro - Val - Lys - Val-Tyr - Pro - NH$_2$)

2.0. of CTB-D-Ser-Tyr-Ser-Nle-NHNH$_2$ are dissolved in 12 ml. of dimethyl formamide, 4 ml. of water are added, cooling is effected to −10°, 2 ml, of 6 N hydrochloric acid and then 280 mg. of sodium nitrite are added, stirring is effected at −5° for 5 minutes, 300 ml. of 0.2 N potassium bicarbonate solution are added and the mixture is centrifuged. The resulting CTB-D-Ser-Tyr-Ser-Nle-N$_3$ is dissolved in 50 ml. of dimethyl formamide, 10.5 g. of H-Glu(OTB)-(Trit)His-Phe-Arg-Try-Gly-(CTB)Lys - Pro - Val - Gly - (CTB)Lys - (CTB) - Lys - Arg-Arg-Pro-Val-(CTB)-Lys-Val-Tyr-Pro-NH$_2$ acetate are added, the mixture is allowed to stand at 0° for 12 hours, a further amount of tetrapeptide azide produced from 2.0 g. of CTB-D-Ser-Tyr-Ser-Nle-NHNH$_2$ is added, the mixture is allowed to stand at 0° for 6 hours, is evaporated, treated with ethyl acetate, washed with hot acetone and ethyl acetate and dried in a vacuum. The resulting product is dissolved in 100 ml. of 90% trifluoroacetic acid, the solution is allowed to stand at 20° in an atmosphere of nitrogen for one hour, is evaporated, treated with ethyl acetate, filtered and dried. The resulting product is dissolved in 500 ml. of 0.2 N acetic acid, the solution is treated with Amberlite IRA–410 in the acetate form, is filtered and lyophilized. After drying over sodium hydroxide, 7.3 g. of H-D-Ser-Tyr-Ser-Nle-Glu-His- Phe - Arg - Try - Gly - Lys - Pro - Val - Gly - Lys- Lys-Arg-Arg-Pro-Val-Lys-Val-Tyr-Pro-NH$_2$-heptaacetate decahydrate, having a homogeneous behaviour in chromatography and electrophoresis, are obtained. (Total hydrolysis gives the following composition of amino acids:

Ser$_{2.1}$Tyr$_{2.0}$Nle$_{1.0}$Glu$_{1.1}$His$_{0.9}$Phe$_{1.0}$
Arg$_{2.9}$Gly$_{2.0}$Lys$_{3.9}$Pro$_{3.1}$Val$_{2.9}$)

*Microanalysis.*—Calculated (percent): C, 51.6; H, 7.5; N, 16.3; O, 24.6. Found (percent): C, 51.8, H, 7.4; N, 16.1; O, 24.4. Melting point 211° with decomposition, $[\alpha]_D^{20}=-84°$ in 1 N acetic acid.

EXAMPLE 10

D - seryl - L - tyrosyl - L - seryl - L - norleucyl - L-glutamyl - L - histidyl - L - phenylalanyl - L - arginyl-L - tryptophanyl - glycyl - L - lysyl - L - prolyl - L-valyl - glycyl - L - lysyl - L - lysyl - L - arginyl - L-arginyl - L - prolyl - L - valyl - L - lysyl - L - valyl-L-tyrosyl - L - proline. (D - Ser - Tyr - Ser - Nle - Glu-His - Phe - Arg - Try - Gly - Lys - Pro - Val - Gly-Lys - Lys - Arg - Arg - Pro - -Val - Lys - Val - Tyr-Pro - OH)

2.0 g. of CTB-D-Ser-Tyr-Ser-Nle-NHNH$_2$ (Example 8) are dissolved in 12 ml. of dimethyl formamide, 4 ml. of water are added, cooling is effected to −10°, 2 ml. of 6 N hydrochloric acid and then 280 mg. of sodium nitrite are added, stirring is effected at −5° for 5 minutes, 300 ml. of 0.2 N potassium bicarbonate solution are added and the mixture is centrifuged. The resulting CTB-D-Ser-Tyr-Ser-Nle-N$_3$ is dissolved in 50 ml. of dimethyl formamide, 10.5 g. of H-Glu(OTB)-(Trit)His-Phe-Arg-Try-Gly - (CTB)Lys - Pro - Val - Gly - (CTB)Lys - Arg-Arg-Pro-Val-(CTB)Lys-Val-Tyr-Pro-OTB acetate are added, the mixture is allowed to stand at 0° for 12 hours, a further amount of tetrapeptide azide produced from 2.0 g. of CTB-D-Ser-Tyr-Ser-Nle-NHNH$_2$ is added, the mixture is allowed to stand at 0° for 6 hours, is evaporated, treated with ethyl acetate, washed with hot acetone and ethyl acetate and dried in a vacuum. The resulting product is dissolved in 100 ml. of 90% trifluoroacetic acid, the solution is allowed to stand at 20° in an atmosphere of nitrogen for one hour, is evaporated, treated with ethyl acetate, filtered and dried. The resulting product is dissolved in 500 ml. of 0.2 N acetic acid, the solution is treated with Amberlite IRA–410 in the acetate form, is filtered and lyophilized. After drying over sodium hydroxide 7.3 g. of H-D-Ser-Tyr-Ser-Nle-Glu - His - Phe - Arg - Try - Gly - Lys - Pro - Val - Gly-Lys - Lys - Arg - Arg - Pro - Val - Lys - Val - Tyr - Pro-OH heptaacetate decahydrate, having a homogeneous behaviour in chromatography and electrophoresis, are obtained. (Total hydrolysis gives the following composition of amino acids:

Ser$_{2.0}$Tyr$_{2.1}$Nle$_{1.0}$Glu$_{1.0}$His$_{1.1}$Phe$_{0.9}$Arg$_{3.1}$
Gly$_{2.1}$Lys$_{3.9}$Pro$_{3.0}$Val$_{2.9}$)

*Microanalysis.*—Calculated (percent): C, 51.6; H, 7.4; N, 15.9; O, 25.0. Found (percent): C, 51.4; H, 7.3; N, 15.7, O, 25.2. Melting point 206° with decomposition, $[\alpha]_D^{20}=-82°$ in 1 N acetic acid.

EXAMPLE 11

D - seryl - L - tyrosyl - L - seryl - L - norleucyl - L-glutaminyl - L - histidyl - L - phenylalanayl - L - arginyl-L-tryptophanyl - glycyl - L - lysyl - L - prolyl - L - valyl-glycyl - L - lysyl - L - lysyl - L - arginyl - L - arginyl-L - prolyl - L - valyl - L - lysyl - L - valyl - L -tyrosyl-L-prolinamide. (D - Ser - Tyr - Ser - Nle - Gln - His-Phe - Arg - Try - Gly - Lys - Pro - Val - Gly - Lys-Lys - Arg - Arg - Pro - Val - Lys - Val - Tyr - Pro-NH$_2$)

2.0 g. of CTB-D-Ser-Tyr-Ser-Nle-NHNH$_2$ (Example 8) are dissolved in 12 ml. of dimethyl formamide, 4 ml.

of water are added, cooling is effected to —10°, 2 ml. of 6 N hydrochloric acid and then 280 mg. of sodium nitrite are added, stirring is effected at —5° for 5 minutes, 300 ml. of 0.2 N potassium bicarbonate solution are added and the mixture is centrifuged. The resulting CTB-D-Ser-Tyr-Ser-Nle-$N_3$ is dissolved in 50 ml. of dimethyl formamide, 10.5 g. of H-Gln-(Trit)His-Phe-Arg-Try-Gly-(CTB)Lys - Pro - Val - Gly - (CTB)Lys - (CTB)Lys-Arg - Arg - Pro - Vay - (CTB)Lys - Val - Tyr - Pro - $NH_2$ acetate are added, the mixture is allowed to stand at 0° for 12 hours, a further amount of tetrapeptide azide produced from 2.0 g. of CTB-D-Ser-Tyr-Ser-Nle-$NHNH_2$ is added, the mixture is allowed to stand at 0° for 6 hours, is evaporated, treated with ethyl acetate, washed with hot acetone and ethyl acetate and dried in a vacuum. The resulting product is dissolved in 100 ml. of 90% trifluoroacetic acid, the solution is allowed to stand at 20° in an atmosphere of nitrogen for one hour, is evaporated, treated with ethyl acetate, filtered and dried. The resulting product is dissolved in 500 ml. of 0.2 N acetic acid, the solution is treated with Amberlite IRA–410 in the acetate form, is filtered and lyophilized. After drying over sodium hydroxide 7.4 g. of H-D-Ser-Tyr-Ser-Nle-Gln-His-Phe - Arg - Try - Gly - Lys - Pro - Val - Gly - Lys - Lys-Arg - Arg - Pro - Val - Lys - Val - Tyr - Pro - $NH_2$ heptaacetate decahydrate, having a homogeneous behaviour in chromatography and electrophoresis, are obtained. (Total hydrolysis gives the following composition of amino acids:

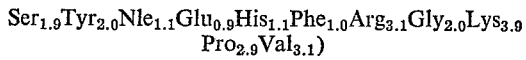

$Ser_{2.0}Tyr_{1.9}Nle_{1.1}Glu_{0.9}His_{1.1}$
$Phe_{1.1}Arg_{3.0}Gly_{1.9}Lys_{4.1}Pro_{2.9}Val_{3.0}$)

*Microanalysis.*—Calculated (percent): C, 51.6; H, 7.5; N, 16.7; O, 24.2. Found (percent): C, 51.4; H, 7.4; N, 16.5; O, 24.1. Melting point 211° with decomposition, $[\alpha]_D^{20} = -78°$ in 1 N acetic acid.

EXAMPLE 12

D - seryl - L - tyrosyl-L-seryl-L-norleucyl-L-glutaminyl-L-histidyl - L - phenylalanyl-L-arginyl-L-trypophanyl-glycyl - L - lysyl - L - prolyl-L-valyl-glycyl-L-lysyl-L-lysyl - L - arginyl-L-prolyl-L-valyl-L-lysyl-L-valyl-L-tyrosyl - L - proline. (D-Ser-Tyr-Ser-Nle-Gln-His-Phe-Arg - Try-Gly-Lys-Pro-Val-Gly-Lys-Lys-Arg-Arg-Pro-Val-Lys-Val-Tyr-Pro-OH)

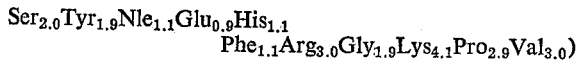

2.0 g. of CTB-D-Ser-Tyr-Ser-Nle-$NHNH_2$ (Example 8) are dissolved in 12 ml. of dimethyl formamide, 4 ml. of water are added, cooling is effected to —10°, 2 ml. of 6 N hydrochloric acid and then 280 mg. of sodium nitrite are added, stirring is effected at —5° for 5 minutes, 300 ml. of 0.2 N potassium bicarbonate solution are added and the mixture is centrifuged. The resulting CTB-D-Ser-Tyr-Ser-Nle-$N_3$ is dissolved in 50 ml. of dimethyl formamide, 10.5 g. of H-Gln-(Trit)His-Phe-Arg-Try-Gly-(CTB)Lys-Pro-Val-Gly(CTB)Lys-(CTB)Lys-Arg-Arg-Pro-Val-(CTB‑Lys-Val-Tyr-Pro-OTB acetate are added, the mixture is allowed to stand at 0° for 12 hours, a further amount of tetrapeptide azide produced from 2.0 g. of CTB-D-Ser-Tyr-Ser-Nle-$NHNH_2$ is added, the mixture is allowed to stand at 0° for 6 hours, is evaporated, treated with ethyl acetate, washed with hot acetone and ethyl acetate and dried in a vacuum. The resulting product is dissolved in 100 ml. of 90% trifluoroacetic acid, the solution is allowed to stand at 20° in an atmosphere of nitrogen for one hour, is evaporated, treated with ethyl acetate, filtered and dried. The resulting product is dissolved in 500 ml. of 0.2 N acetic acid, the solution is treated with Amberlite IRA–410 in the acetate form, is filtered and lyophilized. After drying over sodium hydroxide, 7.6 g. of H-D-Ser-Tyr,Ser-Nle-Gln-His-Phe-Arg-Try-Gly-Lys-Pro - Val - Gly-Lys-Lys-Arg-Arg-Pro-Val-Lys-Val-Tyr-Pro-OH heptaacetate decahydrate, having a homogeneous behaviour in chromatography and electrophoresis, are obtained. (Total hydrolysis gives the following composition of amino acids:

$Ser_{1.9}Tyr_{2.0}Nle_{1.1}Glu_{0.9}His_{1.1}Phe_{1.0}Arg_{3.1}Gly_{2.0}Lys_{3.9}$
$Pro_{2.9}Val_{3.1}$)

*Microanalysis.*—Calculated (percent): C, 51.6; H, 7.5; N, 16.3; O, 24.6. Found (percent): C, 51.3; H, 7.6; N, 16.1; O, 24.8. Melting point 205°, $[\alpha]_D^{20} = -78°$.

What is claimed is:

1. A compound selected from the group consisting of a compound of formula: D-seryl-L-tyrosyl-L-seryl-L-norleucyl-X-L-histidyl - L - phenylalanyl-L-arginyl-L-tryptophanyl-glycyl-L-lysyl-L-prolyl - L - valyl-glycyl-L-lysyl - L - lysyl - L - arginyl - L - arginyl - L - prolyl - L-valyl-L-lysyl-L-valyl-L-tyrosyl-Y, in which X is L-glutamyl or L-glutaminyl and Y is L-proline or L-prolinamide, and the pharmaceutically acceptable acid addition salts and heavy metal complexes thereof.

2. A compound according to claim 1, in which the compound is D-seryl - L - tyrosyl-L-seryl-L-norleucyl-L-glutamyl - L - histidyl-L-phenylalanyl-L-arginyl-L-tryptophanyl-glycyl-L-lysyl-L-prolyl - L - valyl-glycyl-L-lysyl-L-lysyl - L - arginyl-L-arginyl-L-prolyl-L-valyl-L-lysyl-L-valyl-L-tyrosyl-L-prolinamide.

3. A compound according to claim 1, in which the compound is D - seryl-L-tyrosyl-L-seryl-L-norleucyl-L-glutamyl - L - histidyl-L-phenylalanyl-L-arginyl-L-tryptophanyl-glycyl - L - lysyl-L-prolyl-L-valyl-glycyl-L-lysyl-L-lysyl - L - arginyl-L-arginyl-L-prolyl-L-valyl-L-lysyl-L-valyl-L-tyrosyl-L-proline.

4. A compound according to claim 1, in which the compound is D-seryl-L-tyrosyl-L-seryl-L-norleucyl-L-glutaminyl - L - histidyl - L - phenylalanyl - L - arginyl-L-tryptophanyl-glycyl - L - lysyl-L-prolyl-L-valyl-glycyl-L-lysyl-L-lysyl - L - arginyl-L-arginyl-L-prolyl-L-valyl-L-lysyl-L-valyl-L-tyrosyl-L-prolinamide.

5. A compound according to claim 1, in which the compound is D-seryl - L - tyrosyl-L-seryl-L-norleucyl-L-glutaminyl - L - histidyl - L - phenylalanyl-L-arginyl-L-tryptophanyl-glycyl - L - lysyl-L-prolyl-L-valyl-glycyl-L-lysyl-L-lysyl-L-arginyl-L-arginyl-L-prolyl - L - valyl-L-lysyl-L-valyl-L-tyrosyl-L-proline.

References Cited

UNITED STATES PATENTS 3,228,926   1/1966   Kappeler et al. ____ 260—112.5

FOREIGN PATENTS 653,017   3/1965   Belgium _____ 260—112.5
668,250   2/1966   Belgium _____ 260—112.5
724,133   12/1965  Canada  _____ 260—112.5

OTHER REFERENCES

Doepfner: Experientia 22, 527–528 (1966).
Hofmann et al.: Recent Progress In Hormone Research, vol. 18, Academic Press, New York (1962), p. 65.

ELBERT L. ROBERTS, Primary Examiner

U.S. Cl. X.R.
424—179